United States Patent [19]

Rossi

[11] 3,854,893

[45] Dec. 17, 1974

[54] LONG SIDE CHAIN POLYMERIC FLOW IMPROVERS FOR WAXY HYDROCARBON OILS

[75] Inventor: Albert Rossi, Warren, N.J.

[73] Assignee: Exxon Research and Engineering Company, Linden, N.J.

[22] Filed: June 14, 1972

[21] Appl. No.: 262,719

[52] U.S. Cl............................ 44/62, 44/70, 44/80
[51] Int. Cl.............................................. C10l 1/20
[58] Field of Search........................... 44/62, 70, 80

[56] References Cited
UNITED STATES PATENTS

| | | | |
|---|---|---|---|
| 3,069,245 | 12/1962 | Wythe et al. | 44/62 |
| 3,248,186 | 4/1966 | Brownawell et al. | 44/62 |
| 3,449,251 | 6/1969 | Tunkel et al. | 44/62 |
| 3,598,552 | 8/1971 | Cohen et al. | 44/62 |
| 3,645,704 | 2/1972 | Burkard et al. | 44/62 |
| 3,661,541 | 5/1972 | Hollyday, Jr. | 44/62 |

FOREIGN PATENTS OR APPLICATIONS

| | | | |
|---|---|---|---|
| 1,244,506 | 9/1971 | Great Britain | 44/62 |
| 1,244,205 | 8/1971 | Great Britain | 44/62 |
| 1,154,966 | 6/1969 | Great Britain | 44/62 |

Primary Examiner—Patrick P. Garvin
Assistant Examiner—Mrs. Y. H. Smith
Attorney, Agent, or Firm—Frank T. Johmann

[57] ABSTRACT

Combination of two or more oil-soluble, polymeric materials having long linear side chains can be used to improve the flow properties of hydrocarbon oils containing high boiling waxes, such as fuel oils containing residua and crude oils. Examples of these polymeric materials include: condensation polymers of dicarboxylic acid or anhydride, polyol and monocarboxylic acid; addition polymers of: unsaturated esters, or long chain alpha monoolefins, or copolymers of said olefins with said unsaturated ester; polystyrene acylated with long chain fatty acid; etc. The invention also includes a method for formulating said polymer combinations to achieve an optimum effect in oil subject to pour point reversion, by giving samples of the oil containing the individual polymers a series of thermal histories, measuring the pour point of each of said samples to determine Flow Point, i.e., the highest pour point that the oil exhibits, and then blending the polymers to achieve a minimum Flow Point.

10 Claims, No Drawings

LONG SIDE CHAIN POLYMERIC FLOW IMPROVERS FOR WAXY HYDROCARBON OILS

FIELD OF THE INVENTION

This invention relates to polymeric additives having long side chains as flow improvers for petroleum fuel oils and crude oils.

BACKGROUND OF THE INVENTION

PRIOR ART

Recently, various oil-soluble polymers characterized by long linear side chains have become known as flow improvers for oils containing high boiling waxes, e.g. waxy crude oils and residua-containing fuel oils. One group of polymers described in British Pat. No. 1,215,214 and U.S. Pat. No. 3,447,916 is prepared by condensation reactions of a dicarboxylic acid, or anhydride with a basic material which can be a polyol, polyamine or amino alcohol, together with a monocarboxylic acid. The resulting condensation polymer, e.g. a polyester, is taught as a flow improver for residual fuel oils. A further improvement of this type of flow improver condensation polymer is described in British Pat. No. 1,215,214, wherein pentaerythritol is the polyol. Similarly, addition polymers having long linear side chains have been described in British Pat. Nos. 1,154,966, 1,161,188 and 1,197,474 as flow improvers for crude and residua-containing fuel oils. The most important of these addition polymers are prepared by polymerizing long chain unsaturated esters, such as copolymers of vinyl acetate and behenyl fumarate, or homopolymers of behenyl methacrylate, etc. Another class of addition polymers, which are taught as useful in residua and heavy fuel oils, are those described in South African Pat. No. 70/6785, and published German application 1,940,944. Here, long chain alpha olefins are copolymerized with maleic anhydride, which copolymer is then further reacted with long straight chain alcohols or amines. Another class of flow improvers is taught in U.S. Pat. No. 3,248,186 wherein acylated polystyrene having 20 to 22 carbon atoms in a straight chain alkyl group is a residua oil flow improver. U.S. Pat. No. 3,535,767 teaches a process of adding a $C_{18}$ to $C_{24}$ carboxylic acid halide Friedel-Crafts catalyst complex to styrene dissolved in a solvent, to thereby simultaneously polymerize and acylate the styrene to thereby make acylated polystyrene useful as a pour depressant for crudes, residua and light fuel oils.

Still another class of long chain flow improvers known to the art are polymers and copolymers of straight chain $C_{18}$ to $C_{40}$ alpha monoolefins, for example see British Pat. No. 1,267,604 which shows their use in crude oil and French published patent application 6,931,526 in residuum.

SUMMARY OF THE INVENTION

The present invention includes the finding that various mixtures of two or more long side chain flow improving polymers, such as those of the aforesaid prior art, are particularly effective in oils subject to pour point reversion, together with a method of determining the optimum mixture for said oils. The invention therefore includes blends of two or more oil-soluble polymeric flow improvers, each having at least 25 wt. percent of the polymer in the form of $C_{18}$ to $C_{44}$, preferably $C_{20}$ to $C_{36}$, straight chain saturated aliphatic side chains. These flow improvers will usually have molecular weights (number average) in the range of 1400 to 100,000, preferably 2000 to 20,000. The blends will comprise 10 to 90 wt. percent, preferably 20 to 70 wt. percent, of each type polymer present. The invention also includes waxy oil compositions containing wax boiling above 600°F., and usually boiling above 650°F., at atmospheric pressure, and comprising a major amount of a petroleum oil which may be residua-containing fuel oil, flash or vacuum distillate, heavy fuel oils, crude oils, and shale oils, and a flow improving amount, in the range of about 0.0001 to 2.0 wt. percent, preferably 0.0025 to 0.30 wt. percent, based on the weight of said composition, of said mixture of two different flow improving polymers. For convenience in handling, concentrates of these mixed polymers, in the range of about 2 to 60 wt. percent of total polymer, can be prepared in a major amount of oil, preferably aromatic type oils such as heavy aromatic naphtha, Varsol, and kerosene extracts, or mineral lubricating oils.

The invention also includes a method of selecting polymers to be blended in a particular oil for optimum effect, based upon the pour point of the oil. Pour points of black oils, e.g. residuum, residua-containing fuel oils, and crude oils are frequently determined by the ASTM-D97-66 procedure (IP Designation: 15/65). Briefly described, the upper pour point of this ASTM procedure is carried out by preheating a sample of the oil to 115° in a test jar equipped with a thermometer, cooling the sample in prescribed cooling baths, and periodically examining the oil as it cools at 5°F. intervals. When examination shows the oil no longer flows, i.e., no movement of the oil is detectable by holding the jar against a light and tilting it, 5°F. is then added to the temperature registered on the thermometer and this is the upper pour point. The lower pour point of the oil is determined by heating to 220°F. and then cooling in the test jar, again determining the temperature at which the oil no longer flows when the jar is tilted, and then adding the 5°F. to the temperature registered on the thermometer. The pour point carried out on the oil preheated to 115°F. is referred to as the upper pour point because normally the 115°F. preheating will give a higher pour point, than the pour point obtained by the aforedescribed procedure of preheating to 220°F. In the case of these black oils, pour point reversion sometimes occurs wherein the pour point that is obtained by the ASTM-D97 procedure may vary depending upon the prior thermal history of the oil. Thus, the same oil may give two different upper ASTM pour points depending upon the prior thermal history of the oil during storage, transportation, etc. It has been found that instead of running the pour points only at preheating temperatures of 115° and 220°F. as specified by said ASTM procedure, running pour points at a greater number of preheating temperatures, will give a more accurate determination of the maximum pour point that the oil may exhibit. In addition, by first heating the oil sample to 200°F. to put all the wax in solution, and then suddenly cooling it to around 0°F. to induce maximum crystallization, the prior thermal history of the oil is erased. Then if the oil is heated to a predetermined temperature for about ½ hour, a new thermal history can be imparted to the oil. Since the highest pour points almost always occurs at the lower preheat temperatures, it has been found that by heating different samples of the oil to preheat temperatures of 100°, 115°, 130° and 150°F. for ½ hour, and then following the ASTM D97 for the pour point, that a series of pour points will be obtained, of which the highest is hereinafter referred to as the Flow Point. This Flow Point is the highest pour point that would be expected to be exhibited by the oil, regardless of what thermal history the oil encountered.

The prior art flow improvers, or pour point depressants, described above, sometimes give different pour points depending upon the thermal history of the oil. This is known as pour point reversion, wherein the oil at certain preheat temperatures tends to revert back to a higher pour point. This reversion frequently occurs with residua, and to a lesser extent with most crude oils. Residua and crude oils are very complex mixtures of paraffin wax, microcrystalline wax, asphalts, asphaltenes, resin, bitumens, etc. Why pour point reversion occurs with various polymers is not known. However, in this complex mixture of materials, some of which crystallize at different temperatures, the interactions between the wax, the polymeric pour point depressants, and the oil, are probably also complex. The present invention includes the finding that by testing the oil with different pour point depressants to determine its pour point at different preheat, i.e., reheat temperatures, one can blend two or more flow improvers to obtain an optimum Flow Point, which can be lower than that obtained by the individual polymers alone.

THE PETROLEUM OILS

The oils which can be treated with the polymer blends of the invention include straight residuum from the atmospheric distillation of crude oil or shale oil or mixtures thereof. Residuum containing fuel will usually contain from about 5 to 100 percent, e.g. from about 35 percent to 100 percent by weight, of straight residuum which preferably boils above 600°F., or more usually above 650°F., at atmospheric pressure. The residuum containing fuels can also be blends of residuum and distillate oils. The distillate oil, in turn, can be a middle distillate fuel oil usually boiling in the 300°-700°F. range or a vacuum or flash-distillate oil usually boiling in the 650° to 1,100°F. range at atmospheric pressure.

Vacuum or flash-distillates are those distillate fuels obtained by vacuum distillation at reduced pressure of the residue obtained from the distillation of crude oil at atmospheric pressure. Such fuels are prepared by distilling under atmospheric pressure, a crude oil to a bottom temperature of approximately 650°F. or higher, thereby obtaining an atmospheric residua which is then divided by flashing under greatly reduced pressure, into a flashed distillate and a vacuum residue. In flash distillation, preheated feed is continuously introduced into a flash chamber, where evaporation occurs under constant equilibrium conditions. Gaseous and liquid products are continuously removed. Fractionation plays no significant part in flashing. The temperature at which flashing is conducted is limited by potential cracking and carbonization. These side reactions begin to set in if temperatures exceed 800°F. Flashing is usually conducted at greatly reduced pressure, in order to secure high distillate yield from a given atmospheric residue.

Shale oils per se may also be treated with the polymer blends of the invention, as may the crude oils themselves.

Some residuums, i.e., residual oils, have extremely high pour points, particularly those obtained from North African crudes, e.g. Libya, due to a high wax content. These oils also have low sulfur contents, e.g. about 0.4 wt. percent sulfur, which make them particularly desirable because of air pollution requirements, in spite of the handling difficulties due to their high wax content. These oils can be particularly improved by additives. Usually oils having 2 to 25 wt. percent wax boiling above about 650°F. will give the best response to wax modifying additives, while oils with lesser amounts of wax normally do not present flow problems. A few straight residuums have so much wax that in the unblended state they would require uneconomical additive treats or give only small improvements. These oils are best handled, usually by blending with a lower wax content oil, e.g. a distillate or another residuum, so as to reduce the total high boiling wax content to a point where the additive achieves a relatively large effect with a small amount of additive.

Table I, which follows, illustrates the Flow Points of some high pour point residuums having atmospheric boiling points (Final Vapor Temperature) of 650° or 680+°F., which experience has shown are particularly amenable to treatment with flow improvers, either applied to the residuum or to the residuum cut-back with lower pour point residuums or distillate fuels.

TABLE I

| | PETROLEUM RESIDUA OILS | | | | | | | | | |
|---|---|---|---|---|---|---|---|---|---|---|
| | 1 | 2 | 3 | 4 | 5 | 6 | 7 | 8 | 9 | 10 |
| Location | | | Libya | | | | Nigeria | | -Venezuela- | Sumatra |
| Field: | Zelten | Mabruk | Raguba | Dahra | Waha | Bomu | Ebubu | Oloibiri | San Joaquin | Minas |
| Flow Points of Residua (°F.): | 105 | 110 | 97 | 95/100 | 85 | 100+ | 100+ | 100+ | 110+ | 115 |
| *°FVT Cut Point of Residua: | 680+ | 680+ | 650+ | 650+ | 650 | 650 | 650 | 650 | 650 | 650 |

*FVT = Final Vapor Temperature

While as previously indicated, a large number of polymeric flow improvers with long linear side chains are now known to the art, and can be used to make the polymer blends of the invention, only the more important of these are summarized below.

THE CONDENSATION POLYMERS

These are preferably polymers of alkyl or alkenyl substituted dicarboxylic acid or anhydride wherein the alkyl or alkenyl group includes a linear portion of 18 to 44, preferably 22 to 30 carbon atoms, with a polybasic material, e.g., polyol and a monocarboxylic acid.

The substituted dicarboxylic acids, or their anhydrides can be represented by the general formulas:

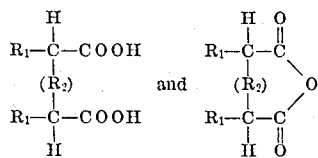

wherein each $R_1$ can be hydrogen or a hydrocarbon group such as an alkenyl group or alkyl group of 1 to 44 carbon atoms, with at least one of said $R_1$ including a $C_{18}$ to $C_{44}$ linear group. Preferably $R_2$ is a saturated aliphatic carbon group of 0 to 6 carbon atoms. A ready source of the acid or anhydride can be readily made by the ene reaction of an olefin with maleic anhydride, e.g. the reaction of $C_{22}$ alpha monoolefin and maleic anhydride.

The polyol includes pollyhydric aliphatic alcohols having 2 to 6 hydroxy groups and a total of 2 to 12, e.g. 4 to 8, carbon atoms. Examples of such alcohols include ethylene glycol, glycerol, sorbitol, pentaerythritol, polyethylene glycols, diethanol amine, triethanolamine, N,N'-di(hydroxyethyl)-ethylene diamine, and the like. If the alcohol reactant contains reactive amino hydrogens (or if an amine reactant contains reactive hydroxyl groups), a mixture comprising the reaction products of the substituted succinic acid reactant and both the hydroxyl and amino functional groups is possible. Such reaction products can include half-ester, half-amides, esters, amides, and imides.

The monocarboxylic acid is of the formula $R_3COOH$ wherein $R_3$ is an alkyl group, preferably straight chain. However, acids where $R_3$ is an alkenyl, alkaryl, aryl, or aralkyl group may be used. Examples of suitable acids are dodecanoic acid, heptadecanoic acid, eicosanoic acid, tetracosanoic acid, triacontanoic acid, benzoic acid, and phenyl acetic acid. Mixtures of monocarboxylic acids may be used. Preferably, since it is usually desirable to include as many linear $C_{18}$ to $C_{44}$ alkyl groups as possible in the polymer to thereby increase potency, $R_3$ will usually be such an alkyl group.

In order to prepare the polymer, the three components are condensed with one another, preferably in equimolar quantities but small variations from equimolar quantities can readily be used, e.g. 0.8 to 1.6 moles of dicarboxylic acid or anhydride, reacted with 0.8 to 1.2 moles of polyol, and 0.7 to 1.2 moles of monocarboxylic acid. Processes for preparing these polymers are described in detail in the aforesaid U.S. Pat. No. 3,447,916, and essentially simply involve heating the monomers together in a condensation reaction and removing water until the desired molecular weight is achieved. Usually, to minimize gelling due to crosslinking, the polyol and monocarboxylic acid may be premixed and then added to the dicarboxyl acid component.

ADDITION POLYMERS OF UNSATURATED ESTERS

As previously indicated, another useful class of polymers include polymers of long side chain unsaturated esters. These esters are generally unsaturated mono and diesters represented by the formula:

wherein $R_1$ is hydrogen or $C_1$ to $C_5$ alkyl groups; $R_2$ is -OOCR$_4$ or -COOR$_4$ group wherein $R_4$ is a $C_{18}$ to $C_{44}$, preferably a $C_{22}$ to $C_{30}$, alkyl group; and $R_3$ is hydrogen or -COOR$_4$. The monomer, when $R_1$ is hydrogen and $R_2$ is -OOCR$_4$ includes vinyl alcohol esters of $C_{18}$ to $C_{44}$ monocarboxylic acids. Examples of such esters include vinyl stearate, vinyl behenate, vinyl tricosanote, etc. When $R_2$ is -COOR$_4$, such esters include stearyl acrylate, stearyl methacrylate, behenyl acrylate, behenyl methacrylate, tricosanyl acrylate, tricosanyl methacrylate, etc. Examples of monomers where $R_1$ is hydrogen, and $R_2$ and $R_3$ are both -COOR$_4$ groups, include: esters of unsaturated dicarboxylic acids such as eicosyl fumarate, docosyl fumarate, eicosyl maleate, docosyl citraconate, docosyl maleate, eicosyl citraconate, docosyl itaconate, tricosyl fumarate, tetracosyl maleate, pentacosyl citraconate, hexacosyl mesaconate, octacosyl fumarate, noncosyl maleate, triacontyl citraconate, hentriacontyl mesaconate, triacontyl fumarate, etc.

The long chain aliphatic esters described above may be prepared from aliphatic alcohols containing from 18 to 44 carbon atoms per molecule. Saturated aliphatic alcohols containing from 20 to 30 carbon atoms per molecule are preferred. Mixed esters derived by the reaction of the acids with a mixture of alcohols may be used, and one may also use a mixture of alcohols wherein a minor amount of the alcohol contains shorter chain alcohols, e.g. 1 to 17 carbon atoms per molecule. Examples of alcohols suitable for use in producing the esters include straight chain normal primary alcohols such as stearyl, non-adecyl, eicosyl, docosyl, tricosyl, tetracosyl, pentacosyl, hexacosyl, heptacosyl, octacosyl noncosyl, and triacontyl alcohols, etc.

Commercially marketed mixtures of alcohols consisting essentially of saturated alcohols of the requisite chain length may be employed in preparing the long chain esters. One such mixture is marketed under the trade name Behenyl alcohol and is a mixture of alcohols derived from natural sources, and consists primarily of docosyl alcohol but contains minor amounts of other alcohols containing from 16 to 24 carbon atoms per molecule.

The carboxylic acid esters of this invention may also be prepared from straight chain as well as branched chain alcohols having a linear chain length, excluding branching, of from 18 to 40 carbon atoms per molecule.

Short chain unsaturated esters, having the above-noted formula but wherein $R_4$ has less than 18 carbons, preferably 1 to 5 carbons, in amounts of 30 to 70 molar percent, based on the total polymer, can be copolymerized with the long chain unsaturated esters. For example, monomers such as vinyl acetate can be copolymerized with di-behenyl fumarate.

The ethylenically unsaturated monomers described in the preceding paragraphs are polymerized in a conventional manner. For example, the polymerization reaction may be carried out without diluent or in a solution of a hydrocarbon solvent such as heptane, benzene, cyclobenzene or white oil at a temperature in the range of from 60°F. to 250°F. and may be promoted by a peroxide type catalyst such as benzoyl peroxide, a hydroperoxide or an azo catalyst such as alpha - alpha' - azo - bis - isobutyronitrile. It is generally preferred to carry out the polymerization reaction under a blanket of an inert gas such as nitrogen in order to exclude oxygen. The polymerization time may vary from 1 to 36 hours.

OLEFIN POLYMERS

Olefin polymers which can be either homopolymers of long chain alpha monoolefins, or copolymers of said long chain monoolefins with short chain olefins, are also useful in the invention. Thus, these polymers will generally comprise 20 to 100 wt. percent $C_{20}$ to $C_{46}$ alpha-olefin and 0 to 80 wt. percent $C_3$ to $C_{18}$ monoolefin. Of these, copolymers containing 50 to 96 wt. percent of linear $C_{22}$ to $C_{46}$ alpha monoolefin and 4 to 50 wt. percent of $C_3$ to $C_{18}$ monoolefin are particularly effective. An especially preferred polymer comprises 60–80 wt. percent of a $C_{22-30}$ alpha-olefin and 20 to 40 wt. percent of a $C_4$-$C_6$ alpha-olefin.

The $C_{20}$-$C_{46}$ alpha-olefin monomer which is used to prepare the polymer of the invention may be represented by the following general formula: $H_2C=CHR$ wherein R is a substantially linear aliphatic hydrocarbon radical containing from 18 to 44 carbon atoms. The term "substantially linear" denotes those aliphatic side chains, e.g. R above which contain no more than one lower alkyl side chain such as methyl, ethyl, etc., in the radical and wherein said lower alkyl side chain, when present in the radical is located at a position such that R has a linear portion containing at least 18 carbon atoms. Examples of such monomers include, among others, n-eicosene-1, 3-methyl docosene-1, n-docosene-1, n-tetracosene-1, 3-methyl tetracosene-1, n-hexacosene-1, n-triacontene-1 and the like.

The $C_3$-$C_{18}$ alpha-olefins may be represented by the following general formula: $H_2C = CHR'$, wherein R' is a hydrocarbon radical containing from 1 to 16 carbon atoms. Since the lower alpha-olefin apparently serves only to disrupt the degree of order of the polymer, there appears to be no criticality as to the configuration of R'. Accordingly, R' may be an alkyl, aralkyl, aryl, alkyaryl or cycloaliphatic group. Examples of such monomers include propylene, butene-1, hexene-1, octene-1, decene-1, 3-methyl decene-1, tetradecene-1, styrene and styrene derivatives such as p-methyl styrene, p-isopropyl styrene, alpha-methyl styrene, etc.

These olefin polymers may be conventionally prepared by polymerizing the monomers under relatively mild conditions of temperature and pressure in the presence of a Ziegler-type catalyst, i.e., a mixture of a compound derived from a Group IV, V or VI metal of the Periodic Table in combination with an organo metallic compound of a Group I, II, or III metal of the Periodic Table wherein the amount of the compound derived from a Group IV – VI metal may range from 0.01 to 2.0 moles per mole of the organo metallic compound.

Effective catalysts for polymerizing the monomers of the invention include the following combinations: aluminum triisobutyl and vanadium trichloride; aluminum triisobutyl, aluminum chloride, and vanadium trichloride; vanadium tetrachloride and aluminum trihexyl; vanadium trichloride and aluminum trihexyl; vanadium triacetylacetonate and aluminum diethyl chloride; titanium tetrachloride and aluminum trihexyl; titanium trichloride and aluminum trihexyl; titanium dichloride and aluminum trihexyl, etc.

The polymerization is usually carried out by mixing the catalyst components in an inert diluent such as a hydrocarbon solvent, e.g., hexane, benzene, toluene, xylene, heptane, etc., and then adding the monomers into the catalyst mixture at atmospheric or superatmospheric pressures and temperatures within the range between about 50° and 180°F. Usually atmospheric pressure is employed when polymerizing the monomers containing more than 4 carbon atoms in the molecule and elevated pressures are used for the more volatile $C_3$-$C_4$ alpha-olefins. The time of reaction will depend upon, and is interrelated to, the temperature of the reaction, the choice of catalyst, and the pressure employed. In general, however, ½ to 5 hours will complete the reaction.

Usually, based upon 100 parts by weight of polymer to be produced, about 120 to 100,000 parts by weight of solvent, and about 0.05 to 5 parts by weight of catalyst will be used in the polymerization.

COPOLYMERS OF UNSATURATED ESTERS AND OLEFINS

Another class of useful addition polymers are those of an unsaturated ester and an alpha-olefin. These can be prepared by direct copolymerization of the olefin and ester. However, it is usually easier to polymerize the olefin with unsaturated acid, preferably a dicarboxylic acid, and then esterify with alcohol.

Suitable ethylenically unsaturated dicarboxylic acids have 4 to 10 carbons and include maleic acid, fumaric acid, mesaconic acid, citraconic acid, itaconic acid, trans and cisglutaconic acids. The corresponding anhydrides (where they exist) can also be used. Preferred is maleic anhydride or its derivatives such as methyl maleic anhydride, dimethyl maleic anhydride, ethyl maleic anhydride, etc.

The ethylenically unsaturated dicarboxylic acid, or anhydride or derivative thereof is reacted with an olefin containing 18 or more carbon atoms per molecule. Although there is no upper limit to the number of carbon atoms per molecule, in practice olefins containing between 18 and 46, e.g. between 20 and 32, carbon atoms per molecule will generally be used. Mixtures of olefins may be used, e.g. a $C_{22}$-$C_{28}$ mixture. Suitable olefins include 1-alkanes, 2-alkenes and the like, including the $C_{20}$-$C_{46}$ alpha monoolefins described in detail above.

The reaction between the dicarboxylic acid, anhydride or derivative and olefin can conveniently be carried out by mixing the olefin and anhydride or derivative, usually in about equimolar amounts, and heating the mixture to a temperature of at least 180°F., preferably at least 250°F. A free radical polymerization promoter such as t-butyl hydroperoxide or di-t-butyl peroxide is normally used. The addition product thus prepared is reacted with an alcohol or with an amine, containing 18 to 44 linear carbons. Such alcohols include eicosanol, $C_{22}$ Oxo alcohol, tetracosanol, as well as those previously described, and may include mixtures of such alcohols, for example commercial behenyl alcohol derived from rapeseed oil. Examples of amines are 1-docosylamine; 2-tetracosylamine; 1-docosyl ethyl amine; etc.

ACYLATED STYRENE POLYMERS

The acylated polystyrenes can be made either by acylating polystyrene in a manner described in the aforementioned U.S. Pat. No. 3,535,767 or by the process of U.S. Pat. No. 3,655,767.

For every styrene moiety there usually will be about 0.5 to about 1 moiety of acyl groups. A typical structure where there is a 1 to 1 mole ratio of styrene and acyl moieties can be represented by the formula:

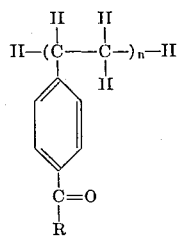

where R represents linear, i.e., unbranched, alkyl group in the $C_{18}$ to $C_{44}$ carbon range, and n is sufficient to give the aforementioned desired molecular weight.

The effectiveness of the aforedescribed long side chain polymer is related to the proportion of the polymer that is in the form of these long linear side chains. Therefore, maximum effectiveness is generally achieved by using long chain material, e.g. alcohols, olefins, etc. which are of relatively high purity. However, effective additives can be made by using various low cost commercial materials which are rich in the desired component. For example, a commercial $C_{30+}$ olefin which was a bottoms fraction from the synthesis of alpha-olefin from ethylene using organic metallic-type catalyst in a growth reaction is a source of low cost long chain olefins and is quite effective even though it contained only about 50 wt. percent of the more effective alpha-monoolefin.

The polymeric additive blends of the invention can be used in combination with still other additives, e.g. rust inhibitors, antioxidants, sludge dispersants, etc.

The invention will be further understood by reference to the following examples which includes a preferred embodiment of the invention.

EXAMPLE I

The following specific polymers were used:

POLYMER A

This is a condensation polymer of about 1.45 molar proportions of a $C_{30+}$ alkenyl succinic anhydride, about 1.0 molar proportion of pentaerythritol and about 1.9 molar proportions of a mixture of $C_{20}$-$C_{22}$ fatty acids. This copolymer was prepared by reacting the above-noted materials together at about 200°C. for about 6 hours under distillation to remove the eliminated water.

The molecular weight, after dialysis to remove unreacted and low molecular weight components, was about 5,000 number average by Vapor Phase Osmometry. The $C_{30+}$ alkenyl succinic anhydride was prepared by reacting maleic anhydride by an "ene" reaction with an olefin mixture having an average mol. wt. of about 650 prepared by polymerization of ethylene in a growth reaction using an organic metallic catalyst.

An analysis of a sample of the $C_{30+}$ olefins showed a carbon distribution on a weight basis as follows: $C_{22}$-0.72 percent; $C_{24}$-2.18 percent; $C_{26}$-6.37 percent; $C_{28}$-12.96 percent; $C_{30}$-15.65 percent; $C_{32}$-14.0 percent; $C_{34}$-11.37 percent; $C_{36}$-8.57 percent; $C_{38}$-7.05 percent; $C_{40}$-6.05 percent; $C_{42}$-4.3 percent; $C_{44}$-3.73 percent; $C_{46}$-3.45 percent; $C_{48}$-2.24 percent and $C_{50}$-1.38 percent.

Analysis of this $C_{30+}$ fraction also shows a total olefin content of about 90 wt. percent and about 10 wt. percent non-olefinic, e.g. paraffinic. The 90 wt. percent olefin portion was about 50 wt. percent of linear alpha olefin, about 25 wt. percent of cis-trans olefins of the formula R-CH=CH-R and about 15 wt. percent of 1,1 dialkyl olefin of the structure

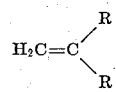

wherein each of said R groups represent alkyl groups of varying lengths.

The $C_{20-22}$ fatty acid was a commercial straight chain saturated acid, which had an iodine number of 4.7, a total acid number of 164, and a Sap No. of about 170. Analysis showed a carbon distribution as follows: $C_{16}$-2.2 wt. percent; $C_{18}$-2.9; $C_{20}$-38.8; $C_{22}$-53.2; and $C_{24}$-1.8, with the remaining 1.1 wt. percent indicated as isomers, e.g. branched chain acids.

POLYMER B

A typical laboratory prepartion of this polymer is as follows:

To a 500 ml, 4-necked flask having a stirrer, thermometer, and charging funnel were added: 129 gms. (1.30 mole) of maleic anhydride and 458 gms. (1.25 moles) of a $C_{22-28}$ alpha olefin mixture. The reactants were heated to 145°C. and di-t-butyl peroxide was added at a rate of 2 gms. per hour for a period of 6 hours. The reaction was terminated after 6 hours by the addition of 580 gms. of Solvent 150 Neutral, which is a light mineral lubricating oil. The copolymer, dissolved in the oil, was then esterified by the addition of 424 gms. (1.3 moles) of a commercial behenyl alcohol, then followed by heating for 8 hours at 300°F., while removing the water of reaction by bubbling nitrogen through the reaction mixture. Additional oil was added to give a concentrate of 50 wt. percent oil and 50 wt. percent reaction product.

28.9 gms. of the oil concentrate was dialyzed for 6 hours with boiling hexane solvent at 70°C. in a Soxhlet extraction device, using a semi-permeable rubber membrane, to remove low mol. wt. components, e.g. the oil, unreacted monomer, etc. 9.9 gms. of residue, representing the polymer, was obtained having a number average mol. wt. of 2,800 Vapor Phase Osmometry.

The $C_{22-28}$ alpha olefin mixture that was used had a typical analysis of about 90 wt. percent olefin and about 10 wt. percent of non-olefinic material, e.g. paraffins, and was prepared by the growth reaction of ethylene with an organic metallic catalyst. The 90 wt. percent olefin fraction was about 50 wt. percent alpha monoolefin, about 25 wt. percent of cis, trans olefin of the formula R-CH=CH-R, and about 15 wt. percent of 1,1 dialkyl olefin of the structure

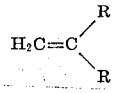

wherein each R represents varying alkyl groups. Since said $C_{22-28}$ olefin mixture was a distillation cut, the total carbons in the various types of olefin molecules was primarily 22 to 28 carbons. Analysis of the aforesaid 50 wt. percent alpha monoolefin portion indicated a typical distribution as follows: about 32 wt. percent n-$C_{22}$ alpha olefin, about 35 wt. percent n-$C_{24}$ alpha olefin, about 22 wt. percent n-$C_{26}$ alpha olefin, about 8 wt. percent n-$C_{28}$ alpha olefin and about 3 wt. percent $C_{30+}$ alpha olefin.

The commercial behenyl alcohol that was used was a mixture of straight chain alcohols derived from rapeseed oil and containing about 16 wt. percent of $C_{18}$ alcohol, about 15 wt. percent of $C_{20}$ alcohol and about 69 percent of $C_{22}$ alcohol.

POLYMER C

An esterification reaction flask was charged with 35.0 gms. (1 mole) of polyanhydride resin PA-18 from Gulf Chemical, 31.3 gms. of commercial behenyl alcohol (same as used in making Polymer B) and 0.1 gms. of toluene sulfonic acid as esterification catalyst, followed by heating to 210°–220°C. for 5 hours while blowing nitrogen through the flask contents to remove water and complete the esterification of the maleic anhydride portion of the copolymer. The esterification catalyst was left in the product.

The polyanhydride resin was a copolymer of octadecene-1, maleic anhydride in about a 1 to 1 mole ratio, having a number average mol. wt. of about 21,400 and a saponification number of about 227.

POLYMER D

A 4-neck reaction flask equipped with an electric heating mantle, stirrer, charging funnel, thermometer, condenser and a Dean-Starke water trap, was charged with: 179 gms. of a $C_{22+}$ alcohol, 33.25 gms. of fumaric acid, 2.0 gms. of p-toluene sulfuric acid as esterification catalyst and 25 ml. hexane. The flask contents were heated in the range of 114° to 140°C. over the course of several days for a total of about 15 hours, during which time a total of 6.5 cc. of water collected in the trap by azeotropic distillation. After about the eighth hour of heating, an additional 0.5 gms. of said catalyst was added, while an additional 10 cc. of hexane was added after about the tenth hour.

At the end of said 15 hours, the flask was drained and the ester product was cooled in the flask while stirring with hot tap water for a short time, followed by turning off the stirrer so that the water layer would separate, drawing off the bottom layer through a bottom drain in the flask. Then the aforesaid procedure was repeated with a dilute NaOH solution (about 7 gms. NaOH dissolved in about 170 ml. water and 30 ml. isopropyl alcohol) and again with hot tap water, to thereby neutralize and remove the catalyst.

The washed ester product above was charged to a polymerization flask equipped with a bottom drain, electric heating mantle, stirrer, thermometer, dropping funnel, and an overhead condenser, together with a nitrogen line fixed to the condenser. 18.2 gms. of vinyl acetate was also charged to the flask and nitrogen was bled through the system to evacuate it of air. Then 0.5 gms. of Lucidol 70 (70 wt. percent benzoyl peroxide in 30 wt. percent water) was added as a polymerization free radical promoter. The flask was heated for a total period of about 16 hours over three working days, while maintaining a temperature of about 80°C. and maintaining the nitrogen blanket. After the fourth hour of heating, another 0.2 gms. of the Lucidol 70 was added. The reaction was followed with a polarograph, i.e., periodically samples were taken and checked on the polarograph, which gave an indication of the free fumarate remaining, i.e., fumarate not yet polymerized. At the end of said 16 hours operating time, the polarograph indicated that a 90+ percent conversion of the fumarate had occurred and the reaction was stopped. A 20.5 gms. sample of the copolymer product was dialyzed for nine hours in boiling hexane using a semipermeable rubber membrane to hold said sample in a Soxhlet extraction device. This leached out low mol. wt. components, e.g. unreacted monomer. 13.8 gms. of residue, representing the polymer, was obtained having a mol. wt. of about 10,000 by V.P.O.

The $C_{22+}$ alcohol was a synthetic material made by the growth reaction of ethylene using an organic metallic catalyst which is oxidized off to make the alcohol. This $C_{22+}$ alcohol had been recrystallized from methyl ethyl ketone to eliminate some of the impurities. The $C_{22+}$ alcohol that was used was a mixture of saturated straight chain alcohols distributed as follows: $C_{22}$-46.6 wt. percent; $C_{24}$-22.4 wt. percent; $C_{26}$-7.9 wt. percent; $C_{28}$ and higher 2.8 wt. percent. The other 20.5 wt. percent was the impurities still remaining after said recrystallization and was a mixture of paraffins, olefins, carbonyl compounds, etc. from the above-noted synthesis.

Blends of the above polymers in a waxy Brega residua oil were prepared by simply heating and stirring the oil and polymer up to about 180°F. to dissolve the polymer into the oil. The Brega residua oil was obtained by atmospheric distillation to a final vapor temperature of about 650°F. of a crude oil from Libya which is a mixture of about 85 wt. percent of crude from the Zelten Field with the remainder being from the Sarir and Dakar fields. This Brega residua is a very waxy black oil having about 8 to 13 wt. percent wax boiling above 650°F. and having a normal Flow Point of 105°F.

The blends of oil and additive were tested for Flow Point according to the ASTM-97-66 procedure, except that the oil containing the polymer under test was first divided into four samples. Each sample was then heated to 200°F. and quickly cooled to 0°F., to wipe out any thermal prior history of the oil. Following this, the oil samples were heated to various reheat temperatures of 100°, 115°, 130° and 150°F. respectively, where they were maintained at the reheat temperatures for ½ hour. The oil samples were then allowed to air cool down to 90°F. and were then placed in a cooling bath at 30° to 35°F. and from this point on are tested for pour point following the aforesaid ASTM-D97 procedure. The pour point for each of the aforesaid 4 reheat temperatures is thus determined. The polymers tested, the amount of polymer used, and the results obtained are summarized in the following Table 11, together with the Flow Point which is defined as the highest pour point obtained at any of the 4 reheat temperatures under consideration.

TABLE II

| Polymer | Polymer % | FLOW POINT TEST Pour Point, °F. at Reheat Temp. | | | | Flow Point, °F. |
|---|---|---|---|---|---|---|
| | | 150 | 130 | 115 | 100 | |
| None | None | 105 | 105 | 105 | 105 | 105 |
| Polymer A | 0.15 | 55 | 55 | 70 | 90 | 90 |
| Polymer B | 0.15 | 75 | 85 | 85 | 75 | 85 |
| Polymer C | 0.15 | 50 | 55 | 85 | 55 | 85 |
| Polymer D | 0.15 | 70 | 60 | 65 | 90 | 90 |
| Polymer A Polymer B | 0.15 | 50 | 60 | 65 | 70 | 70 |
| Polymer A Polymer C | 0.15 | 45 | 50 | 60 | 50 | 60 |

TABLE II-Continued

| Polymer | Polymer % | FLOW POINT TEST Pour Point, °F. at Reheat Temp. | | | | Flow Point, °F. |
|---|---|---|---|---|---|---|
| | | 150 | 130 | 115 | 100 | |
| Polymer B Polymer D | 0.15 | 65 | 65 | 70 | 70 | 70 |

As seen by the above table, the Brega residua gave pour points of 105°F. at each of the four reheat temperatures of 150°, 130°, 115° and 100°F. 0.15 wt. percent Polymer A was effective at the higher reheat temperatures of 150° and 130°F., but was less effective at 100°F. In all cases the percent polymers, i.e., 0.15 percent, in Table 11 is the weight percent of undialyzed polymer products without diluent oil. Polymers B, C and D all were more effective at one temperature than at another. The mixtures of the polymers gave results considerably better than would have been expected by the mere addition of the individual effect of each polymer. In fact, the pour point at a particularly reheat temperature in some cases was even less than either component above. For example, the combination of Polymers A and B at the 150°F. reheat temperature gave a pour point of 50°F., while A per se gave 55° and B per se gave 75°. Similarly, at the 115° and 100°F. reheat temperatures, the combination of A and B gave a pour point less than either A or B by itself and considerably less than the average of the two materials. Thus, looking at the 115° reheat temperature and averaging A and B, i.e., 70 + 85 divided by 2, would give an expected result of either 75 or 80 since the pour test is reported to the nearest 5°F. Similarly, at the 100° reheat the average of 90 and 75 would be expected to be either 80° or 85°. In both these latter two instances, i.e., at the reheat temperature of 115° and 100°F., the combination gave pours considerably below the average and even below the individual effects of either material by itself.

Similarly, the combination of Polymers A and C gave lower pours than either component alone at reheat temperatures of 150°, 130°, 115° and 100°, and gave considerably lower pours than the additive effect one would have expected by averaging the individual effects of Polymers A and C.

The combination of Polymers B and D gave similar synergistic results at various reheat temperatures. Thus, Table 11 demonstrates that by running the pour points of the oil at various reheat temperatures that one can blend a polymer which may be less effective at a particular reheat temperature, with another polymer that is effective at said reheat temperature, and obtain an overall improvement, which as indicated by the data above, can be considerably more than expected by simply averaging the individual effects. Thus, using the method outlined above, a new tool is placed in the hands of the additive supplier, who can tailor-make blends of pour depressant additives to fit the characteristics of a particular heavy waxy oil.

Also, as noted before, the more important criteria is the Flow Point, which is the highest pour point encountered at any of the reheat temperatures used. The significance of this is illustrated with Polymer A of Table 11, whereas if the oil (after blending the additive) had reached a temperature during storage of 150°F., and then cooled, then its pour point would be expected to be 55°F. On the other hand, if the oil containing Polymer A had been heated or stored at 100°F., its pour point would be 90°F. as indicated. Thus, by measuring pour point over a representative range of reheat temperatures that the oil may encounter in actual use, one can determine the Flow Point — which is the temperature at which the oil will flow regardless of the storage or handling temperatures the oil may have encountered. When considering Flow Point, while each of Polymers A, B, C and D were all effective in reducing Flow Point, the Polymer mixtures were particularly effective.

EXAMPLE II

The following materials were used in this Example:

Polymer E — this is a copolymer of about 0.9 molar proportion of vinyl acetate and about one molar proportion behenyl fumarate having a number average molecular weight of about 19,000 V.P.O. (Vapor Phase Osmometry). The behenyl alcohol used to prepare the fumarate is the same as the commercial behenyl alcohol previously described with regard to Polymer B.

The above Polymer E and the aforedescribed Polymer A were individually, and in combination, blended with a high sulfur heavy vacuum gas oil (HVGO) boiling in the range of about 650° to 1,100°F. at atmospheric pressure, obtained by vacuum flashing a residua remaining after atmospheric distillation at 650°F. of a Venezuelan crude oil.

Both Polymers E and A were in the form of oil concentrates of 75 wt. percent of oil and 25 wt. percent of the polymeric product, i.e., active ingredient. The HVGO was treated with 0.02, 0.05, and 0.1 wt. percent, (based on the total composition) of said concentrates of Polymer E and A by simply heating to 180°F. with stirring. The treated HVGO was then tested for pour point in the 4-reheat test previously described and the Flow Point determined by each treatment. The compositions tested and the Flow Point obtained are summarized in the following Table III:

TABLE III

| Concentration, % | Flow Point, °F. | | |
|---|---|---|---|
| | 0.02 | 0.05 | 0.1 |
| Polymer A concentrate | 75 | 70 | 70 |
| Polymer E concentrate | 80 | 70 | 55 |
| 50% Polymer A concentrate 50% Polymer E concentrate | 75 | 65 | 55 |

As seen by Table III above, the 50/50 wt. percent blends of the Polymer A and Polymer B concentrates gave a Flow Point lower than would have been expected by simply averaging their individual effects. This result became more pronounced as the concentration of the additive increased up to 0.1 percent concentrate or a total active ingredient of 0.025 wt. percent, i.e., 0.0125 wt. percent Polymer A and 0.0125 wt. percent Polymer E.

In summary, the invention relates to combinations of at least two, or even more, long side chain polymeric flow improvers, i.e., wax crystal modifiers, for improving the flow of the oil. In addition to its other advantages, these combinations give the additive supplier greater flexibility in making the additives since the commercial sources and availability of the long chain components, e.g. alcohols, olefins, and acids, are limited. Thus, behenyl alcohol is generally derived from rapeseed oil and the world-wide availability is limited. Similarly, the world-wide production of long chain olefins, such as the $C_{30+}$ olefins, is also limited. Long chain acids, such as the $C_{20-22}$ fatty acids are commercially derived from fish oil and this supply is also limited. Thus, by being able to use additive blends, the additive supplier is less dependent on any one source of raw material or its availability.

What is claimed is:

1. An oil composition comprising a major amount of petroleum oil selected from the group consisting of residua-containing fuels boiling above 600°F., distillate fuels boiling above 600°F. and crude oils, said petroleum oil being improved in its Flow Point by about 0.0001 to 2.0 wt. percent of a synergistic mixture of 10 to 90 parts by weight of a first polymeric flow improver with 10 to 90 parts by weight of a second polymeric flow improver, said flow improvers having molecular weights in the range of 1400 to 100,000; said flow improvers being selected from the group consisting of:

a. polyester condensation products of 0.8 to 1.6 molar proportions of an alkenyl succinic anhydride containing 18 to 44 linear carbon atoms in the alkenyl group with 0.8 to 1.2 molar proportions of a $C_4$ to $C_{12}$ polyol containing 3 to 4 hydroxy groups and 0.8 to 1.2 molar proportions of a $C_{19}$ to $C_{45}$ saturated aliphatic monocarboxylic acid;

b. addition polymers consisting essentially of polymer of unsaturated ester, and comprising a major proportion by weight of long chain unsaturated ester represented by the formula:

wherein $R_1$ is hydrogen or a $C_1$ to $C_5$ alkyl group; $R_2$ is —$OOCR_4$ or -$COOR_4$ wherein $R_4$ is a long chain $C_{18}$ to $C_{44}$ alkyl group; and $R_3$ is hydrogen or -$COOR_4$; and c. copolymers of $C_{18}$ to $C_{46}$ olefin with a $C_4$ to $C_{10}$ ethylenically unsaturated dicarboxylic acid esterified with one to two molar proportions of $C_{18}$ to $C_{44}$ straight chain alcohol per molar proportion of said dicarboxylic acid, and wherein said synergistic mixture is selected from the group consisting of: mixtures of flow improvers (a) and (b), mixtures of flow improvers (a) and (c); and mixtures of flow improvers (b) and (c) as defined above.

2. An oil composition according to claim 1, wherein said flow improver (b) is a copolymer of 30 to 70 molar percent of the long chain unsaturated ester of (b) with 30 to 70 molar percent of short chain unsaturated esters of the formula defined in (b) above except that $R_4$ is a $C_1$ to $C_{17}$ group.

3. An oil composition according to claim 1, wherein said oil is said residua-containing fuel, which fuel contains about 35 to 100 wt. percent of residua from the atmospheric distillation of crude oil.

4. A composition according to claim 3, wherein said synergistic mixture is a mixture of said flow improver (a) and said flow improver (b).

5. A composition according to claim 3, wherein said mixture is a mixture of said flow improver (a) and said flow improver (c).

6. A composition according to claim 3, wherein said mixture is a mixture of said flow improver (b) and said flow improver (c).

7. A composition according to claim 4, wherein (a) is the condensation polymer of $C_{30+}$ alkenyl succinic anhydride, pentaerythritol and $C_{20-22}$ fatty acid; and wherein (b) is a copolymer of dialkyl fumarate and vinyl acetate.

8. A composition according to claim 7, wherein (a) is the condensation polymer of $C_{30+}$ alkenyl succinic anhydride, pentaerythritol and $C_{20-22}$ fatty acid; and wherein (c) is a polymer of $C_{22-28}$ olefin with maleic anhydride esterified with behenyl alcohol.

9. A composition according to claim 6, wherein (b) is a copolymer of dialkyl fumarate and vinyl acetate, and (c) is a polymer of $C_{22-28}$ olefin with maleic anhydride esterified with behenyl alcohol.

10. A method of improving the Flow Point of a waxy petroleum fuel oil containing about 35 to 100 wt. percent residua boiling above 600°F., which comprises forming blends of said oil with at least two different long side chain oil-soluble flow improving polymers characterized by a molecular weight in the range of about 1,400 to 100,000 and at least 25 wt. percent of the polymer weight being in the form of linear alkyl side chains of 18 to 44 carbon atoms, said polymers being selected from the group consisting of:

a. polyester condensation product of 0.8 to 1.6 molar proportions of an alkenyl succinic anhydride containing 18 to 44 linear carbon atoms in the alkenyl group with 0.8 to 1.2 molar proportions of a $C_4$ to $C_{12}$ polyol containing 3 to 4 hydroxy groups and 0.8 to 1.2 molar proportions of a $C_{19}$ to $C_{45}$ saturated aliphatic monocarboxylic acid;

b. addition polymers consisting essentially of polymer of unsaturated ester and comprising a major proportion by weight of unsaturated ester represented by the formula:

wherein $R_1$ is hydrogen or a $C_1$ to $C_5$ alkyl group; $R_2$ is -$OOCR_4$ or -$COOR_4$ wherein $R_4$ is a $C_{18}$ to $C_{44}$ alkyl group; and $R_3$ is hydrogen or -$COOR_4$; and c. copolymers of $C_{18}$ to $C_{46}$ olefin with a $C_4$ to $C_{10}$ ethylenically unsaturated dicarboxylic acid esterified with one to two molar proportions of $C_{18}$ to $C_{44}$ straight chain alcohol per molar proportion of said dicarboxylic acid;

and determining the pour point of said blends at a series of different thermal histories to thereby determine the Flow Point for each blend of oil and polymer, and then blending at least two of said polymers to achieve a minimum Flow Point in said oil.

* * * * *